Nov. 8, 1949 H. CANDELAND ET AL 2,487,522
ELECTRICAL SIGNALING SYSTEM
Filed Jan. 16, 1945 5 Sheets-Sheet 1

INVENTORS
BY Harold Candeland
Zygmunt Konstant Hass.
Cameron, Kerkam + Sutton
ATTORNEYS

Nov. 8, 1949  H. CANDELAND ET AL  2,487,522
ELECTRICAL SIGNALING SYSTEM
Filed Jan. 16, 1945  5 Sheets-Sheet 5

a — LENGTHENED SIGNAL PULSE b — GATE PULSE c — OVERLAP PULSE

Fig. 11.

INVENTORS
Harold Candeland
BY Zygmunt Konstanty Hess.
Cameron, Kerkam & Sutton
ATTORNEYS Patented Nov. 8, 1949

2,487,522

UNITED STATES PATENT OFFICE 2,487,522

ELECTRICAL SIGNALING SYSTEM

Harold Candeland and Zygmůnt Konstanty Hass, Christchurch, England, assignors to Minister of Supply in His Majesty's Government of the United Kingdom of Great Britain and Northern Ireland, London, England Application January 16, 1945, Serial No. 573,119
In Great Britain December 23, 1943

Section 1, Public Law 690, August 8, 1946
Patent expires December 23, 1963

2 Claims. (Cl. 250—6)

The present invention relates to electrical signalling systems of the kind in which the intelligence is transmitted in the form of short pulses of radio frequency energy recurring at a frequency higher than the highest component frequency it is desired to transmit. The intelligence is conveyed by modulating some characteristic of the pulses. For example the pulses may be width-modulated, in which case the duration of each pulse is varied in accordance with the instantaneous amplitude of the signal being transmitted. Alternatively, they may be phase or displacement modulated, in which case each pulse is slightly displaced from its mean position in accordance with the instantaneous signal amplitude, so that it occurs slightly before or after its proper recurrence time.

An object of the present invention is to provide a system of this kind which is arranged to give duplex working between two stations over a single channel.

A further object of the invention is to provide improved means for synchronizing the working of the two stations without transmitting any special synchronizing frequency.

Another object of the invention is to provide improved means for demodulating signals of the kind described which have been phase modulated by displacement of the pulses.

According to the present invention in one aspect there is provided an electrical signalling system of the kind described comprising two transmitter-receiver stations linked by a single channel, wherein both stations transmit to each other simultaneously over this channel a train of signal pulses having the same repetition frequency, the time of the transmitted pulses being so controlled that each signal pulse from one station arrives at the other station during the interval between two consecutive signal pulses transmitted by the said other station.

According to a feature of the invention each station is provided with a master oscillator, hereinafter referred to as a gate oscillator, which generates a periodically varying voltage having a saw-toothed wave form of the desired repetition frequency and also generates a train of control pulses hereinafter referred to as "gate" pulses, of the desired repetition frequency, each gate pulse occurring during the fly-back of the saw tooth, the signal pulses at either station being generated by comparing in a suitable circuit the saw toothed voltage with a fixed voltage so that each time substantial equality of the two voltage magnitudes is reached a voltage impulse is generated, the timing of the voltage impulses being so controlled by choice of the magnitude of the fixed voltage that each resulting signal pulse will arrive at the other station so as to overlap a gate pulse generated at said other station.

According to a further feature of the present invention the gate oscillator at a station is synchronized with incoming signal pulses by applying both the gate pulses and the incoming signal pulses to a circuit and deriving in that circuit a control voltage which varies with any variation in the mean overlap period of the gate and signal pulses due to frequency drift of the gate oscillator, this control voltage being utilized to correct the frequency of the gate oscillator and maintain it in synchronism with the incoming signal pulses. The frequency of the gate oscillator at one station can be fixed at predetermined value and the frequency of the other gate oscillator synchronized therewith in this manner, or alternatively both gate oscillators can be synchronized with the incoming signals in which case both stations will adjust themselves to operate in correct frequency and phase relationship and any frequency drift will be shared by automatic corrections at both stations.

The signal pulses are preferably phase modulated, and according to the invention in another aspect there is provided a method of demodulating phase-modulated pulses which comprises applying them to a thermionic valve circuit together with locally-generated pulses of the same repetition frequency but of fixed duration and timing the latter being such that each signal pulse overlaps the corresponding locally-generated pulse by an amount depending upon its displacement from the unmodulated position, the circuit being arranged to conduct only during the overlap periods and thus to produce an output voltage consisting of pulses varying in width in accordance with the instantaneous amplitude of the modulating current, these output pulses being converted into a voltage of varying amplitude by any known or suitable means.

This method of demodulation is combined with the method of synchronization already referred to when dealing with phase-modulated signals, in which case the gate pulses themselves are utilized as the locally-generated pulses referred to above, and the thermionic valve circuit includes a low-pass filter traversed by the output current, from which is obtained a voltage which varies in accordance with changes in the overlap period occurring at a frequency below the lowest modulation frequency transmitted, this voltage serving as the control voltage for maintaining the gate oscillator in synchronism with the incoming signal pulses.

The nature of the various features of the invention will be best understood by reference to the following description of a single channel duplex transmitting and receiving system embodying the invention.

Referring now to the drawings, wherein like reference characters indicate like elements throughout the several views.

Figure 1:
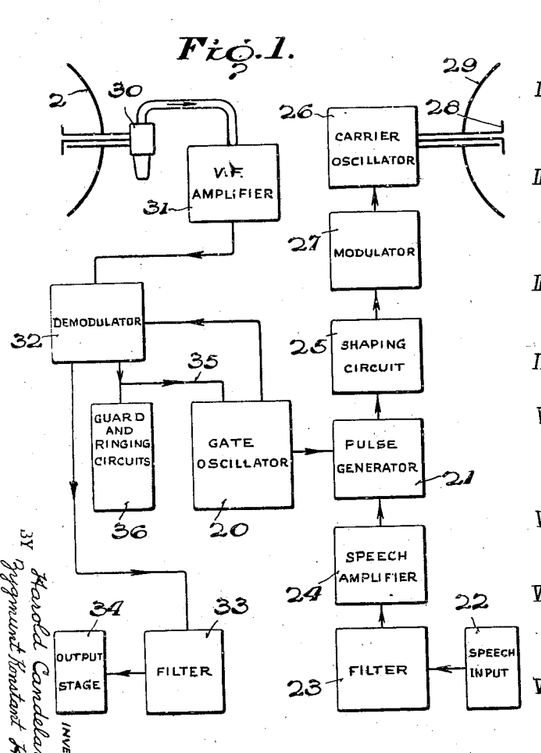
Fig. 1 is a block schematic diagram of the combined transmitting and receiving equipment employed at each station in the electrical signalling system of the present invention.

The system operates at a radio frequency corresponding to a wavelength of a few centimetres and the intelligence is transmitted by phase or displacement modulation of pulses of approximately 1 microsecond duration with a repetition frequency of about 10,000 cycles per second. The repetition frequency is generated by means of the gate oscillator 20 which comprises a thermionic valve connected so as to operate as a so-called "Miller" oscillator. A controlling saw-toothed wave form having the desired repetition frequency is produced in the anode circuit of this valve (curve I, Fig. 2) whilst negative-going voltage pulses are produced in the screen-grid circuit, these pulses coinciding with the shorter slope of the saw tooth wave (curve II, Fig. 2). These pulses will be hereinafter referred to as gate pulses and are utilized in a manner to be described to effect the demodulation of the incoming signal pulses. The repetition frequency of the saw tooth wave and gate pulses depends upon the cathode potential of the valve and thus can be controlled by varying this potential. The saw tooth wave is amplified and reversed in polarity and applied to the control grid of a valve forming part of a pulse generating circuit 21 (curve III, Fig. 2). By variation of the potential between the grid and cathode of this valve, it can be made to conduct at any desired point on the longer slope of the saw-tooth wave, thus producing a series of pulses having the desired repetition frequency and a timing which will depend upon the potential between grid and cathode.

Incoming speech currents from the circuit 22, pass through a band-pass filter 23 and an amplifier 24 and are utilized to vary the potential difference between the grid and cathode of the pulse generator valve, thus slightly displacing or shifting the phase of each pulse in accordance with the instantaneous amplitude of the incoming speech currents.

The pulses are shaped in a circuit 25, the output of which will consist of narrow positive phase modulated video frequency pulses having a duration of about one microsecond. This is shown in curve IV of Fig. 2, in which the dotted lines X, Y etc. indicate the position of the points on the saw-tooth wave at which the generator would normally conduct in the absence of speech modulation, so that the onset of the generated pulses would coincide with those lines in the absence of modulation. The first pulse indicated at $a$ in curve IV is shown in the unmodulated position whilst the remaining three pulses are slightly displaced from the unmodulated position by varying amounts.

The carrier frequency is generated by a magnetron oscillator 26, the amplitude of the carrier being modulated in accordance with the pulsed waveform from 25 by a modulator 27. The carrier is radiated by an aerial system comprising a dipole 28 placed at the focus of a parabolic reflector 29.

Figure 2:
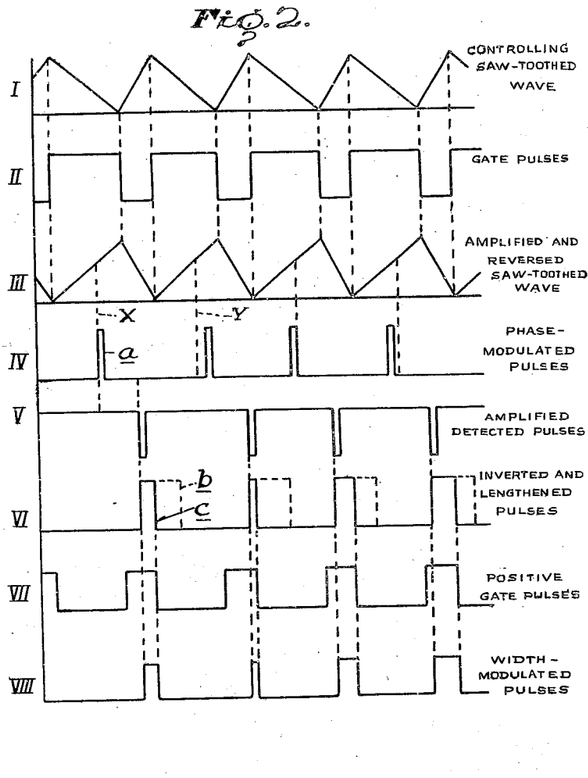
Fig. 2 is a diagram illustrating the characteristics of certain of the waves and pulses produced by the equipment of Fig. 1.

The incoming pulse-modulated carrier from the co-operating station is picked up by the receiving aerial system comprising a dipole 1 at the focus of a parabolic mirror 2. At the co-operating station, the bias voltage between grid and cathode of the pulse generator is so chosen that the timing of the pulses received on dipole 1 is such that they interlace with the pulses transmitted from dipole 28 and, moreover, is such that they coincide with the gate pulses generated by the oscillator 20. More precisely, they coincide with the gate pulses in such a way that the onset of an unmodulated pulse ($a$ of curve IV) occurs substantially half-way through the duration of a gate pulse. Clearly, in order to achieve this, allowance will have to be made for the time of transmission between the stations which will depend upon the distance separating the stations. The manner in which the timing of the transmitted pulses from the two stations is adjusted to enable them to arrive at the right moment will be explained in detail later.

By using high peak power in the transmitted pulses it is found possible to use a simple crystal receiver 30 so as to detect the incoming carrier. This is followed immediately by a video frequency amplifier 31 which amplifies the detected pulses and passes them on to a demodulating circuit 32, the input to which is shown in curve V of Fig. 2. The pulses shown in this curve will in actual practice be interlaced by the transmitted pulses picked up directly from the dipole 28, but as these latter are suppressed in the demodulation process, they are not shown. In this circuit the pulses are first inverted and lengthened, as shown in curve VI and are then combined with positive gate pulse produced in the circuit 20 (curve VII, Fig. 2). They are combined in a valve which is arranged to conduct only during the overlap period of a gate pulse and the corresponding signal pulse, so that the anode current of the valve will have a waveform as shown in curve VIII of Fig. 2. Clearly this waveform will consist of pulses of variable width, the termination of the pulses being fixed and coincident with the termination of the gate pulses, whilst the onset of the pulses varies with the variable onset of the signal pulses; that is to say, it varies in accordance with the amplitude of the speech currents at the cooperating station. These variable-width pulses are passed through a low-pass filter 33 and output stage 34 which act in known manner to integrate the variable width pulses into a voltage varying in amplitude in accordance with the amplitude of the original speech currents.

There are two ways of operating the equipment. In the first way, one of the stations operates as a "Master" station and the repetition frequency of its saw tooth and gate oscillator 20 is fixed at a predetermined value by applying a suitable fixed potential to the cathode of the oscillator. The other station operates as a "Slave" station whose gate oscillator 20 is synchronised with the incoming of signals. This is done by deriving in the demodulator circuit 32 a voltage which is a function of the mean overlap period of the gate and incoming signal pulses and applying this voltage through lead 35 to the cathode of the gate oscillator 20. Consequently if the frequency of the gate oscillator tends to drift, the mean overlap period changes, and the derived voltage changes in the correct sense to pull the gate oscillator into synchronism. In the second way of operating the equipment, both stations are run as Slave stations in which the gate oscillators are synchronized with the incoming signals, in which case both stations will adjust themselves to operate in correct frequency and phase relationship and any shifts in the repetition frequency will be shared by automatic corrections at both stations.

The synchronizing voltage derived from the demodulator 32 is also fed to the guard and ringing circuit 36. This is simply a circuit responsive to changes in this voltage beyond certain predetermined limits and acts to operate a ringing relay. These limits are exceeded if synchronism between gate and signal pulses is lost in which case the ringing tone acts as a warning that this is so. To provide calling signals means are provided for deliberately upsetting the synchronism between the gate and incoming signal pulses, thus operating the ringing relay. In a master station this is done by changing the frequency of the gate oscillator 20; in a slave station it is done by altering the timing of the pulses generated by the pulse generator 21.

The video frequency amplifier 31 has to handle the output from the crystal detector, which comprises signal pulses of approximately 1 microsecond duration received from both the distant transmitter and also picked up directly from the local transmitter. In addition to the signal pulses a considerable noise voltage is present. Due to the fact that it is the phase and not the shape of the pulses which conveys the intelligence and also due to the distribution of harmonics of the pulse recurrence frequency, it is not necessary for the amplifier to handle very low frequencies and in practice a response ranging from approximately 10 kc./s. to 1 mc./s. is employed and a simplification of design is thus obtainable.

The amplifier is designed to have a very high voltage gain, and in one form comprises five stages, the first three of which are conventional resistance-capacity coupled stages. In the penultimate stage, however, it is necessary to make allowance for the fact that the powerful pulses picked up directly from the local transmitter would render this stage unresponsive to the pulses from the distant transmitter. The last stage is also arranged to pass only a "slice" of the signal so that noise voltage output is eliminated.

Figure 3:
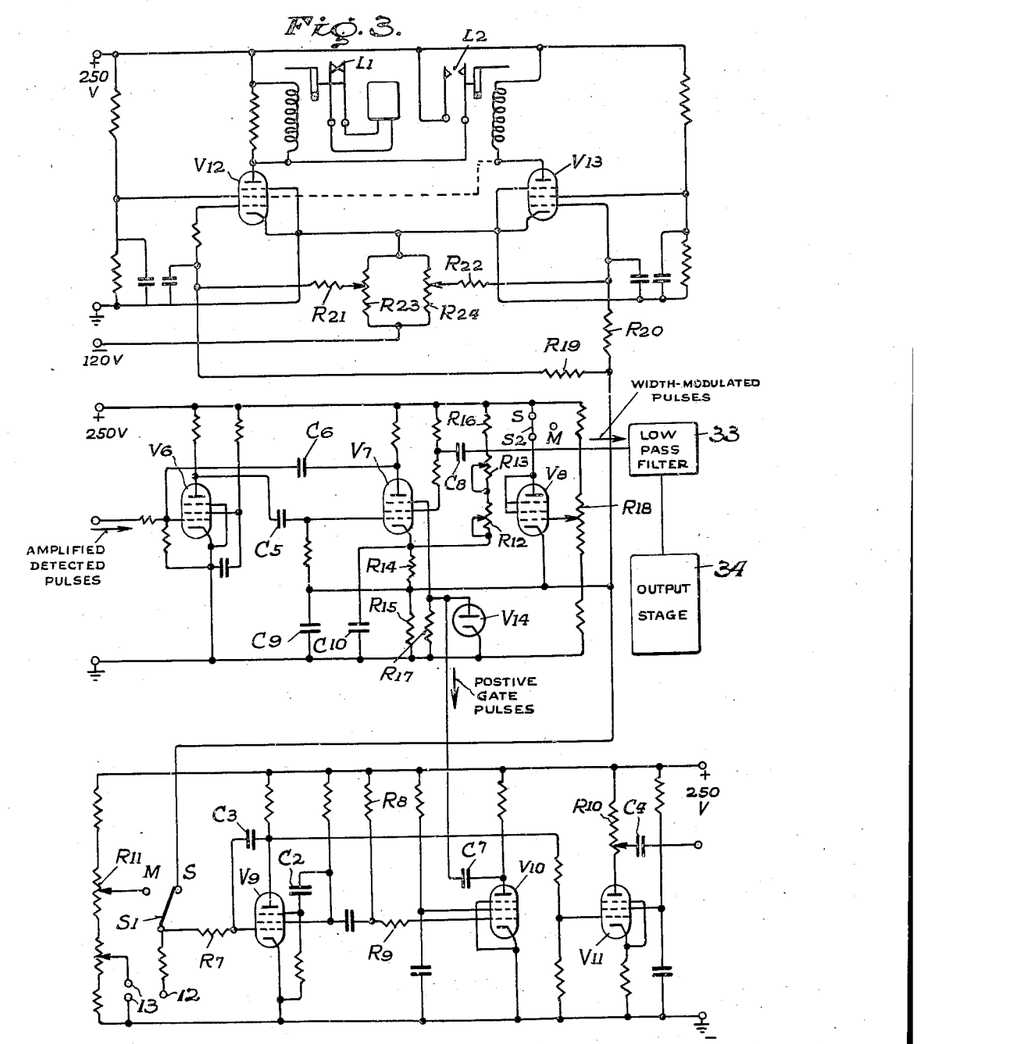
Fig. 3 is a circuit diagram of the receiving unit.

Fig. 3 shows the detailed circuit diagram of the receiving unit. The gate and saw tooth oscillator $V_9$ operates as a so called "Miller" oscillator. The suppressor and screen grids are coupled by a condenser $C_2$ and a small condenser $C_3$ connects the anode and the control grid which is connected to a source of positive bias through a 1 megohm grid resistance $R_7$. Due to the negative transconductance which exists between the screen and suppressor grid a negative-going pulse waveform is produced at the screen as shown in curve II of Fig. 2. During the negative pulse on the screen the anode voltage rises and during the intervals between pulses the anode voltage falls due to the increase in anode current and the presence of the condenser $C_3$. The anode voltage waveform is shown in curve I of Fig. 2, and it will be noted that the negative screen pulse coincides with the steep slope of the saw tooth wave. The negative pulse is amplified and reversed in polarity in the gate amplifier $V_{10}$ the resulting positive gate pulse at the anode being fed to the demodulating circuits. The grid of $V_{10}$ is connected to the H. T. supply through resistances $R_8$, $R_9$ to provide positive grid bias to enable the valve to handle the negative pulse. The saw tooth waveform is amplified and reversed in polarity by the valve $V_{11}$ and a controlled amount from the potentiometer $R_{10}$ in the anode circuit is fed via condenser $C_4$ to the sender circuits.

The frequency at which the oscillator $V_9$ operates is controlled by the voltage applied to its grid. This voltage may be obtained from a recurrence frequency control potentiometer $R_{11}$ connected in a resistance chain across the H. T. supply, when the Master-Slave switch $S_1$ is in the Master (M) position, or may be obtained as a synchronising bias from the demodulator circuits when $S_1$ is in the Slave (S) position. A voltmeter may be connected to the terminal 12 to measure the voltage applied in the grid circuit and so provide an indication of the recurrence frequency. The steady level of the synchronising bias may be adjusted by fine and coarse frequency controls $R_{12}$ and $R_{13}$.

The operation of the pulse lengthener and demodulator circuits comprising the valves $V_6$ and $V_7$ have now to be considered. The video amplifier output which consists of negative pulses of constant duration of aproximately 1 microsecond phase modulated i. e., modulated by displacement in time, are fed to the grid of $V_6$. $V_6$ and $V_7$ are cross coupled through condensers $C_5$ and $C_6$ and form a trigger or "flip-flop" circuit. $V_6$ is normally conducting while $V_7$ is normally cut off by a steady cathode bias provided by the resistances $R_{12}$—$R_{16}$ connected across the H. T. supply. The suppressor grid of $V_7$ has the positive-going gate pulses fed to it through condenser $C_7$ and a diode $V_{14}$ and resistance $R_{17}$ act as a D. C. restorer to maintain the suppressor at a steady negative value which maintains the anode current of $V_7$ cut off except during the period of the gate pulse. The negative signal pulse fed to the grid of $V_6$ cuts that valve off and the resultant positive voltage applied through $C_5$ to the grid of $V_7$ renders that valve conducting. If the suppressor grid of valve $V_7$ was connected to its cathode and no gate pulses were applied thereto, the valves $V_6$, $V_7$ would behave as a normal flip-flop circuit. In other words, the valve $V_7$ would remain conducting for a time determined by the duration of the positive pulse on its control grid, which is in turn determined by the time-constant of the coupling circuit. At the termination of this time, valve $V_7$ would suddenly become cut off and the resulting positive pulse would be applied via condenser $C_6$ to the control grid of valve $V_6$ to render that valve conducting. Since, however, there is a negative bias on the suppressor grid of valve $V_7$ which is only removed for the duration of the positive gate pulse applied thereto, valve $V_7$ will be cut off at the termination of the gate pulse and valve $V_6$ will become conducting at the same instant. The signal pulses applied to the control grid of valve $V_7$ will thus not be lengthened by a constant amount, as shown by the dotted portion $b$ in curve VI of Fig. 2, but will terminate at the end of the gate pulse as shown by the full line $c$ in curve VI. Thus valve $V_7$ will be conducting only during the coincidence of the lengthened signal pulse and the gate pulse, and the signal pulse in the anode circuit of valve $V_7$ will have its trailing edge fixed by the termination of the gate pulse, whilst its onset will vary as determined by the speech modulation.

In Fig. 2, curve V represents the phase modulated signal pulses arriving at the grid of $V_6$ while curve VI represents the lengthened pulses on the grid of $V_7$. The gate pulses fed to the suppressor grid of $V_7$ are indicated in curve VII and it can be seen that the pulses of anode current in $V_7$ corresponding to the periods of overlap of gate and lengthened signal pulses, shown in curve VIII, are width modulated in accordance with the original phase modulation of the signal pulses. Corresponding width modulated pulses occur at the screen grid of $V_7$ and are fed via condenser $C_8$ to a low pass filter 33 which cuts off at about 3000 C. P. S. and which removes the recurrence frequency and passes speech components to the grid of an output valve in the output stage 34.

The resistors $R_{14}$, $R_{15}$ in the cathode circuit of $V_7$ are shunted by condensers $C_9$, $C_{10}$ which smooth out the voltage variations occurring across them due to the signals. The constants of this circuit are so arrranged that frequencies up to about 400 c./s. are not filtered out. A D. C. voltage thus exists across $R_{15}$ which is proportional to the mean degree of overlap of the gate and lengthened signal pulses. This voltage may be employed to synchronise the gate oscillator by feeding it to the grid of $V_9$ via the switch $S_1$ in the slave (S) position. Due to the fact that variations in this control bias up to 400 c./s. are fed to the gate oscillator, signal modulation frequencies below 400 c./s. are not effectively demodulated as the gate pulse tends to follow the phase modulation of the signal pulses below 400 c./s. For this reason frequencies below about 300 c./s. in the speech modulation are removed at the sending end as the wobble of the gate pulses in sympathy with the low frequencies signals would otherwise cause cross modulation between send and received signals. Also the reductions in the efficiency of the demodulation of the lower frequency speech components which are actually used may be compensated by tone control in the output stage.

The actual control bias which is available across $R_{15}$ is approximately 80 volts and varies by plus and minus 15 volts to maintain synchronism. The mean value of this voltage may be set by means of the coarse and fine frequency controls $R_{13}$ and $R_{12}$. To prevent this voltage falling to too low a value if synchronism between gate and signal pulses is lost, a limiter valve $V_8$ is employed. This valve is connected between H. T. and the control bias line and its grid is connected to a potentiometer $R_{18}$ connected across the H. T. supply. The cathode of $V_8$ and thus the control bias is prevented from falling below a value approximately corresponding to the grid voltage of $V_8$. This limiter only operates when the switch $S_1$ is in the slave (S) position and a switch $S_2$ ganged to $S_1$ is provided to open the anode circuit of $V_8$ in the Master (M) position.

The control bias is also taken off to the Guard and Ringing circuits comprising the valves $V_{12}$ and $V_{13}$. The object of these circuits is to ring an alarm bell if the gate oscillator goes out of synchronism and also to provide a normal calling or ringing indication. Calling or ringing is initiated by artificially producing a change in the synchronising bias sufficient to operate the guard circuits. When the calling station is operating as the Master station for the purpose of synchronisation, the frequency of the gate oscillator is shifted by short circuiting terminals 13 which alters the bias on the grid of $V_9$ and produces a change in the gate oscillator frequency sufficient to modify the D. C. component of the voltage across $R_{15}$ by an amount adequate to operate the guard circuits. In these circumstances the limiter valve is not operative. If the equipment is operating as a Slave station the gate frequency cannot be altered for ringing purposes and in this case the necessary alteration in the control bias to operate the guard circuits at the master station is obtained by shifting the phase of the transmitted pulse in a manner to be described later.

The positive synchronising voltage is fed to the grids of the valves $V_{12}$, $V_{13}$ in parallel through high resistances $R_{19}$, $R_{20}$. The grids have also applied to them through high resistances $R_{21}$, $R_{22}$, compensating negative biases from a potentiometer $R_{23}$, $R_{24}$ connected between earth and minus 120 volts. These biases are normally adjusted so that $V_{12}$ is conducting and $V_{13}$ is non-conducting. The contacts of relay $L_1$ in the anode circuit of $V_{12}$ are therefore held open and an external bell or indicator circuit is inoperative. Relay $L_2$ in the anode circuit of $V_{13}$ is not normally closed and its contacts are normally open.

If the overlap of gate and signal pulses in $V_9$ falls below a given minimum value the control bias will also fall to a point at which, due to the setting of $R_{23}$, the current in $V_{12}$ falls to a value at which relay $L_1$ releases and closes the ringing or alarm circuit. If alternatively the overlap and thus the control bias increases beyond a given limit, value $V_{13}$ commences to conduct, relay $L_2$ operates and its contacts short circuit relay $L_1$ which thereupon releases and closes the ringing or alarm circuit. The circuits of $V_{12}$ and $V_{13}$ may be modified to employ only one relay by removing relay $L_2$ and connecting the anode of $V_{13}$ to the screen grid of $V_{12}$ as indicated in dotted lines. If $V_{13}$ conducts then the screen volts of $V_{12}$ fall and relay $L_1$ releases.

Figure 4:
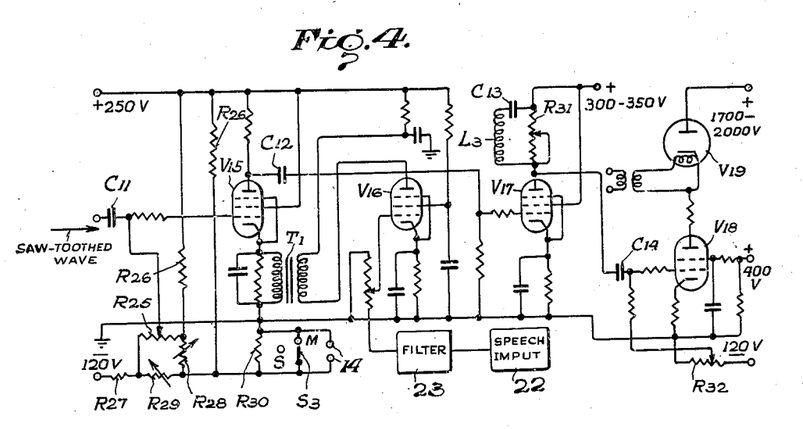
Fig. 4 is a circuit diagram of the sender or transmitter unit.

The detailed circuit diagram of the sender or transmitter unit is shown in Fig. 4.

The saw tooth voltage wave from the anode of $V_{11}$, Fig. 3, is fed through a condenser $C_{11}$ to the grid of the valve $V_{15}$. D. C. bias for the grid of $V_{15}$ is obtained from the slider of a potentiometer $R_{25}$ connected in series with resistances $R_{26}$ and $R_{27}$. In parallel with $R_{25}$ are connected two variable resistances $R_{28}$, $R_{29}$ in series, the centre point of which is connected to earth through a resistance $R_{30}$. This resistance $R_{30}$ is permanently short-circuited by contacts of the switch $S_3$ when it is in the Master (M) position, this switch being ganged to the switches $S_1$, $S_2$ (Fig. 3). The bias applied to the grid of $V_{15}$ can thus be varied both positively and negatively with respect to the cathode potential by variation of $R_{25}$, the limits of variation being set by adjustments of $R_{28}$ and $R_{29}$. The instant at which the applied saw tooth voltage causes $V_{15}$ to become conducting can thus be set to correspond to any point along the positive-going slope of the saw tooth. In the anode of $V_{15}$ is thus produced a negative-going stepped waveform as shown in curve II of Fig. 5. The applied saw tooth wave is shown in curve I, the value of grid bias at which anode current flow commences being indicated by the dotted line $x$. The output from a speech amplifier $V_{16}$ is injected into the cathode circuit of $V_{15}$ through a step-down transformer $T_1$ and thus the onset and termination of the stepped anode waveform of $V_{15}$ are phase modulated in accordance with the instantaneous amplitude of the speech by the variation in the effective grid bias due to the speech voltage in the cathode circuit. The modulation voltage input to the amplifier $V_{16}$ is passed through a band pass filter 23 which cuts off the low frequencies below 300 c./s. which would cause wobble of the gate frequency and cross modulation between sent and received signals in the demodulator, and cuts off high frequencies above about 3000 c./s. which would beat with the pulse recurrence frequency.

Figure 5:
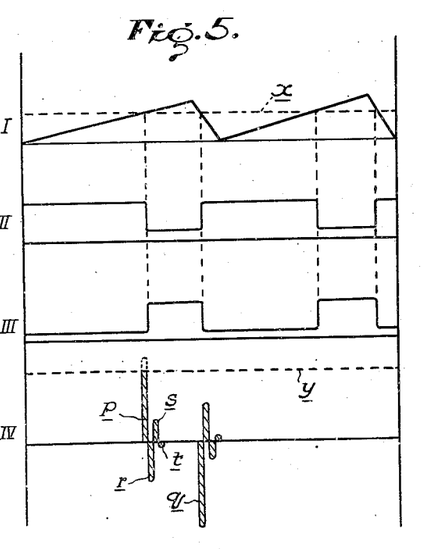
Fig. 5 is a diagram illustrating the characteristics of the waves produced by the various elements of the transmitter unit of Fig. 4.

The negative-going step waveform from the pulse and phase modulator valve $V_{15}$ is fed through condenser $C_{12}$ to the grid of the pulse shaping valve $V_{17}$. This valve has in its anode circuit a resonant circuit $L_3$, $C_{13}$, which is shock excited by the sudden rise of anode voltage. Curve III of Fig. 5 illustrates the anode voltage waveform which would exist without the presence of $L_3C_{13}$ while curve IV indicates the waveform which actually exists. The resonant circuit is approximately critically damped by $R_{31}$ and a short positive pulse $p$ of approximately 1 microsecond duration is produced. A similar negative pulse $q$ is also produced at the end of the stepped waveform but this has no effect as will be seen later. The pulses from the anode of $V_{17}$ are fed through $C_{14}$ to the grid of the modulator valve $V_{18}$. This valve is in series with the magnetron oscillator $V_{19}$ across a high voltage source and is normally biassed off by returning the grid to a point on $R_{32}$ connected between earth and $-120$ volts. $V_{18}$ is thus made conducting for the duration of the positive pulse $p$ from $V_{17}$, as this is of sufficient amplitude to overcome the standing bias indicated by the dotted line $y$ in curve IV, and permits the magnetron to oscillate and transmit a pulse of R. F. approximately 1 microsecond. Any further pulses such as $r$, $s$ and $t$ produced by the circuit $L_3C_{13}$ which may not be quite critically damped, or pulses such as $q$, etc., produced at the end of the stepped waveform applied to the grid of $V_{17}$, will not affect $V_{18}$ as they will not be of sufficient amplitude or of the correct polarity to overcome the cut-off bias.

The resistance $R_{30}$ connected between the approximate centre tap of the pulse shift potentiometer $R_{25}$ and earth, is also connected in series with $R_{26}$ across the H. T. supply. With switch $S_3$ in the slave (S) position, $R_{30}$ is normally short-circuited by the contacts of the ringing circuit. For the purposes of ringing when operating as a slave station, these contacts which are connected across terminal 14, may be opened so that the grid operating point of $V_{15}$ is shifted with a resultant shift of the phase of the transmitted pulse which will cause the guard and ringing circuits in the receiver unit at the co-operating station to operate.

Figures 6A, 6B:
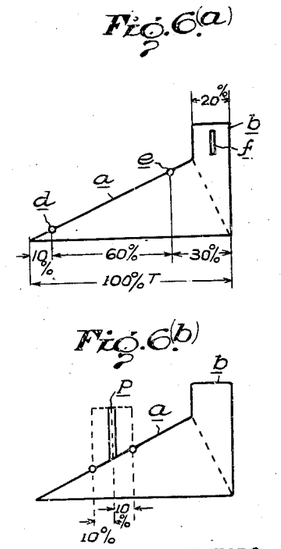
Figs. 6a and 6b are wave diagrams illustrating the effect of the pulse shift controls in the transmitter unit and the phase relation shifts between the transmitted and received pulses and the saw tooth and gate waveforms.

The effect of the pulse shift controls in the sender unit and phase relation shifts between the transmitted and received pulses and the saw tooth and gate waveforms, may be better understood by reference to Fig. 6a and 6b which shows composite waveforms indicative of the positive-going portion $a$ of the saw tooth wave fed to the grid of $V_{15}$ and the gate pulse $b$ appearing at the anode of $V_{10}$. The rectangular gate pulse occupies the position of the negative-going portion of the saw tooth, which is about 20% of the total recurrence period. The transmitted pulse $p$ occurs at some instant of time in the first 80% of the recurrence period corresponding to the saw tooth and for 100% modulation may be moved in time either side of its mean position by an amount equal to 10% of the recurrence period (Fig. 6b). Thus the mean position of the transmitted pulse set by $R_{25}$ may be varied from a point $d$ at a distance from the commencement of the saw tooth equal to 10% of the recurrence period, to a point $e$ the same distance from the end of the saw tooth or 30% before the end of the gate pulse. These limits are indicated on Fig. 6a and are set by adjustment of $R_{28}$ and $R_{29}$. For proper demodulation the received pulse $f$ must occur in the middle of the gate pulse, so that its onset coincides with the mid-point of the gate pulse.

Figure 7:
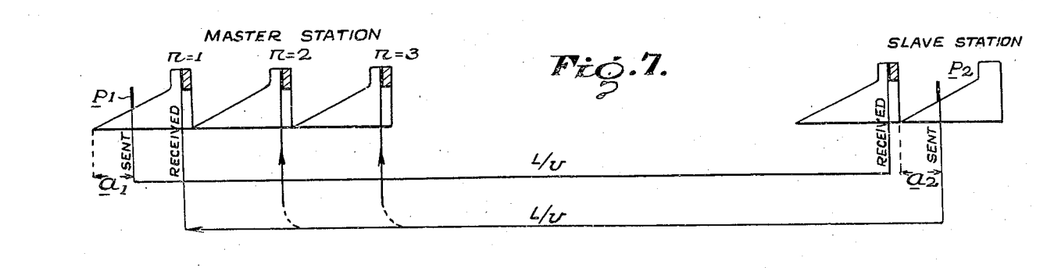
Fig. 7 is a diagram showing a series of schematic waveforms similar to those shown in Figs. 6a and 6b for two stations working in duplex.

The case of duplex working between two stations separated by some distance can best be understood by reference to Fig. 7 which indicates a series of schematic waveform diagrams, similar to those shown in Fig. 6a and 6b, for two stations working in duplex. Consider a pulse $p_1$ sent from the master station which occurs at a fraction $a_1$ of the recurrence period T after the commencement of the saw tooth at that station. This pulse travels the distance L to the co-operating slave station in time $L/v$ where $v$ is the velocity of propagation and at the slave station must occur in the middle of the gate pulse if no modulation is present. At the slave station a pulse $p_2$ is sent at time $a_2T$ after the end of that gate pulse which overlaps the previous pulse $p_1$ sent from the master station and after time $L/v$ arrives at the master station where it in turn must fit into a gate pulse. It may fit into the gate pulse immediately following the first pulse $p_1$ or if the time of propagation $L/v$ is long it may fit into the gate pulse of a subsequent recurrence cycle. The system may be said to be operating in the first, second or third mode, etc., ($n=1$, 2 or 3) depending upon whether the returning pulse occurs in the first, second or third, etc., recurrence period. It is possible therefore to establish a relationship between the various factors which will enable a system to be set up.

If it is remembered that the gate pulse occupies a time equal to 0.2T after the end of each saw tooth wave which occupies the first 0.8 of the recurrence period T, we have the following relationship $$nT - 0.2T = a_1 T + a_2 T + \frac{2L}{v}$$

or $$a_1 + a_2 = n - 0.2 - \frac{2L}{vT}$$

In the practical case both $a_1$ and $a_2$ must lie between 0.1 and 0.7.

Figure 8:
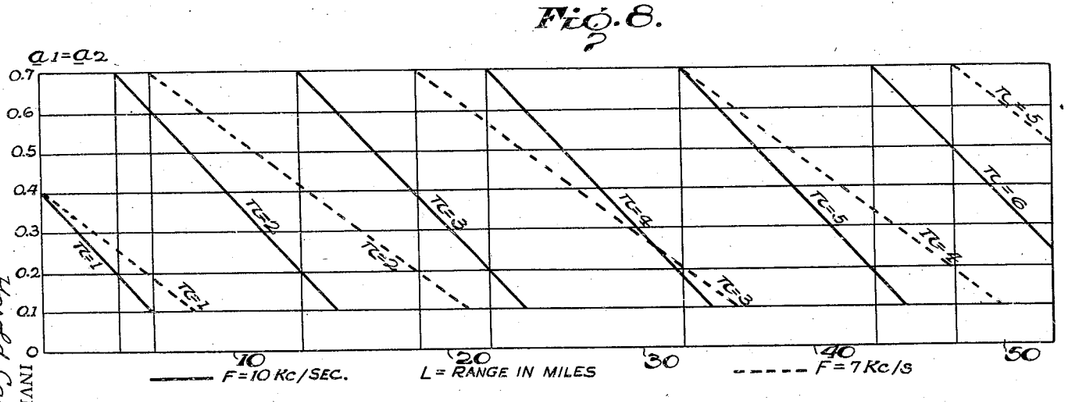
Fig. 8 is a diagram enabling determination of the values representing the settings of the pulse shift control at both stations of a duplex system for two different recurrence frequencies and six different operating modes.

Thus it is possible to construct a diagram which enables values of $a_1$ and $a_2$ representing the settings of the pulse shift control $R_{25}$ at both stations, the appropriate value for $n$ and the value of the recurrence frequency to be determined for a given separation of the two stations. Such a diagram is illustrated in Fig. 8 which shows appropriate values for $a_1$ and $a_2$ for two possible recurrence frequencies of 7 and 10 kc./s. and values of $n$ between 1 and 6 for ranges up to 50 miles. The curves for a recurrence frequency of 10 kc./s. are shown in full line while those for a recurrence of 7 kc./s. are shown dotted.

The description of operation of the system according to the invention which has been given so far, depends upon one station operating as a master station in which the frequency of the gate oscillators are fixed while the co-operating or slave station synchronises itself with the master station. The system will also work perfectly well if both stations are arranged to operate as slaves. If the fine and coarse frequency controls, $R_{12}$ and $R_{13}$ (Fig. 3) are set at both stations so that both gate oscillators are synchronised with the switches $S_1$, $S_2$ and $S_3$ set to the slave (S) position at each station, then any frequency drift occurring at either station will be compensated by changes in frequency at both stations produced by the synchronising bias. The total initial frequency drift is then shared between the two stations.

The process of demodulation of phase modulated pulses according to the invention is not limited to the particular method already described in which the gate pulse commences before the signal pulse, which latter is lengthened and finally cut off at the end of the pulse to produce a width modulated pulse corresponding to the period of overlap of the pulses (curves VI—VIII of Fig. 2). The signal pulse may be lengthened by a definite amount and the gate pulse timed to commence after the beginning and continue after the end of the signal pulse. Moreover the demodulating process is not limited to the case already described in which the signal and gate pulses are applied to the control and suppressor grids of a valve respectively and these voltages may be applied to any suitable pair of electrodes of a valve. For example, the demodulating circuit shown in Fig. 3 may be modified by feeding the gate pulses to the control grid of $V_7$, the condenser $C_5$ being connected between the anode of $V_6$ and the suppressor of $V_7$. Also the lengthening of the received signal pulses is not an inherent part of the demodulation process and if the sent and received pulses are initially of a suitable length the demodulation process by means of the overlapping gate pulses may be operated without previous lengthening of the signal pulses.

Figure 9:
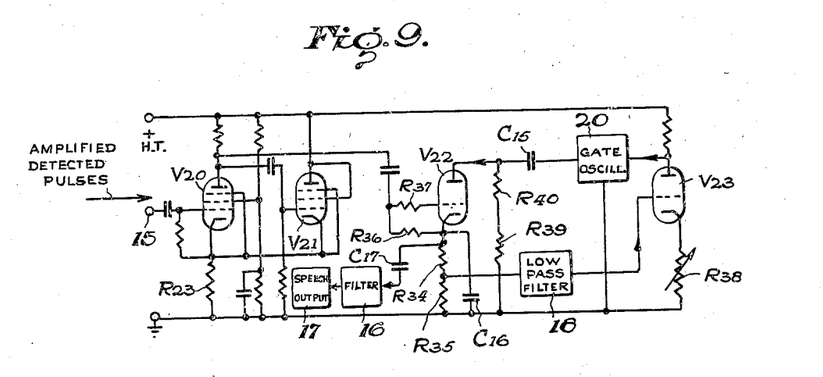
Fig. 9 is a circuit diagram of an alternative form of demodulator employing either lagging or leading signal pulses.

An alternative demodulation circuit employing either lagging or leading signal pulses is illustrated in Fig. 9.

The amplified detected signal pulses are applied through terminal 15 to the grid of a valve $V_{20}$. The valves $V_{20}$ and $V_{21}$ are connected in a "flip-flop" or trigger circuit which lengthens the pulses. $V_{20}$ is normally conducting while $V_{21}$ is normally biassed off by the common cathode resistor $R_{33}$. A negative signal pulse applied to the grid of $V_{20}$ cuts that valve off, and a positive-going pulse is initiated in its anode circuit which renders the valve $V_{21}$ conductive. Due to the time constant of the coupling circuits the valves $V_{20}$ and $V_{21}$ remain in the new condition for some time after the end of the negative signal pulses on the grid of $V_{20}$ and the positive pulses from the anode of $V_{20}$ are consequently lengthened.

The lengthened signal pulses are fed to the control grid of the demodulator valve $V_{22}$. Positive gate pulses from an oscillator 20 are fed through condenser $C_{15}$ to the anode of $V_{22}$, the resistors $R_{34}$ and $R_{35}$ in the cathode circuit forming the load. The valve is self-biassed by the grid leak $R_{36}$ and a resistor $R_{37}$ prevents the grid from getting too high a positive voltage so that in fact the grid is only positive during the period of the applied signal pulses.

Anode current only flows in the valve during the period of overlap of the gate and signal pulses in the manner already described with reference to curves VI—VIII of Fig. 2, so that the signal lags behind the gate pulse. The load resistance $R_{34}$, $R_{35}$ is by-passed by condenser $C_{16}$ for the recurrence frequency but the speech components of the pulses across $R_{34}$ and $R_{35}$ are taken off through condenser $C_{17}$ to a band pass filter 16 and the speech output circuit 17.

The D. C. component of the pulses appearing in $R_{34}$ and $R_{35}$ provides the synchronising bias for the gate oscillator 20 and the voltage across $R_{35}$ is fed via a low pass filter 18 and D. C. amplifier stage $V_{23}$ to control the frequency of the gate oscillator 20. A manual frequency control for the oscillator is provided by a variable resistance $R_{38}$ in the cathode of the D. C. amplifier $V_{23}$. If any change in the frequency of the signal or gate pulses occurs a change in the mean width of the overlap pulses in $R_{34}$ and $R_{35}$ occurs with a resultant change in the D. C. voltage applied to control the frequency of the gate oscillator to produce synchronism. The considerations regarding the filtering of the control voltage described previously also apply to the circuit of Fig. 9. If the low pass filter 18 passes any of the lower speech frequencies which are being employed then the gate oscillator will follow these variations in the voltage across $R_{35}$ and the corresponding frequencies will not be demodulated. The low pass filter is then arranged to pass frequencies below about 200 to 300 c./s. while speech components below about 300 c./s. are not employed.

Figure 10:
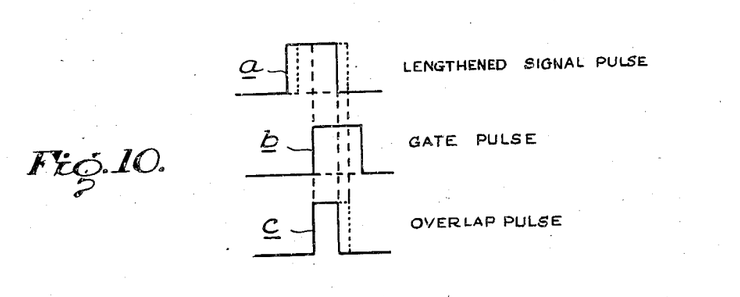
Fig. 10 is a diagram illustrating the characteristics of the pulses produced by the circuit of Fig. 9.

With the circuit just described, if the synchronising arrangements of the gate oscillator 20 are correct, then a relative increase in the frequency of the gate oscillator causes a reduction in the width of the overlap pulses curve VIII, Fig. 2, and a reduction in the control bias which acts to reduce the frequency of the gate oscillator and produce synchronisation. If however the control bias were taken from the resistance $R_{39}$ in series with the resistance $R_{40}$ between the anode of $V_{22}$ and earth then a reduction in the width of the overlap pulses will produce an increase in the control bias. Under these circumstances the signal and gate pulses will so adjust themselves that the signal pulse leads the gate pulse, as shown in Fig. 10, in which $a$ represents the gate pulse, $b$ the lengthened signal pulse and $c$ the overlap pulse. A relative increase in the gate oscillator frequency would then cause an increase in width of the overlap pulses.

Figure 11:
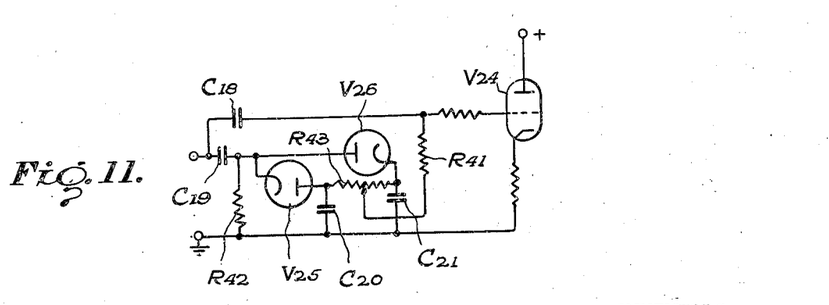
Fig. 11 is a circuit diagram of a modified circuit for adjusting the phase of the transmitted pulse with respect to the saw tooth oscillation, alternative to that illustrated in Fig. 4.

A circuit for adjusting the phase of the transmitted pulse with respect to the saw tooth oscillation, alternative to that illustrated in Fig. 4, is shown in Fig. 11.

The saw tooth waveform is fed in the normal manner through condenser $C_{18}$ to the grid of the phase modulator valve $V_{24}$, the gread leak $R_{41}$ of which is returned to a variable bias obtained by rectification of the saw tooth voltage. This saw tooth wave is fed through $C_{19}$ and appears as an alternating voltage across $R_{42}$. Two reversely connected diodes $V_{25}$, $V_{26}$ with condensers $C_{20}$, $C_{21}$, act as peak rectifiers, and across $C_{20}$ and $C_{21}$ appear D. C. voltages approximately equal to the peak negative and positive values of the saw tooth wave. A potentiometer $R_{43}$ thus enables the grid bias of $V_{24}$ to be set to correspond with approximately any point on the saw tooth wave. The fact that the voltages across $C_{20}$ and $C_{21}$ are not quite equal to the peak values of the wave may be sufficient to provide the limits to the adjustment of the phase of the sent pulse required as indicated in Fig. 6a. If the limits thus set automatically are insufficient, small fixed resistors may be connected in series with the ends of $R_{43}$. Arrangements for shift of phase for signalling purposes can be made in any obvious manner, for instance by the inclusion of resistances in the cathode circuit of $V_{24}$ or in series with $R_{43}$, which are normally short-circuited by ringing circuit contacts.

Although the system which has been described is primarily a single channel duplex equipment and is intended to provide a single communication channel each way between a pair of stations, the system may be adapted to transmit telegraph or teleprinter signals in addition to the speech channel. The telegraph or teleprinter signals are transmitted by causing them to shift the recurrence frequency or the phase of the ordinary transmitted pulses and observing the signals at the receiving end as changes in the control bias voltage obtained from the demodulator circuits. Many ways of performing the change in phase or recurrence frequency of the transmitted pulses will be obvious to those skilled in the art, and the method described for the purpose of transmitting ringing signals in which a portion of the pulse shift potentiometer or the gate oscillator frequency control potentiometer is placed in or out of circuit at will under the control of a relay, is one possible method of performing the keying by telegraph or like signals. In one method of keying by telegraph or like signals the "marks" could be represented by a change in the recurrence frequency of approximately 50 c./s. from the steady value which represents "space," while in an alternative method "mark" and "space" may be indicated by changes in the recurrence frequency of the order of 50 c./s. in opposite directions about a mean frequency. Whichever method of keying is employed the keying frequency must lie below about 300 c./s. in order that it is not smoothed out by the control bias circuits associated with the demodulator.

The changes in the control bias at the receiving station, which follow the changes in recurrence frequency produced by keying with telegraph or like signals at the co-operating station may be utilised by means of any convenient method known in the art. The circuits employed for ringing and guard purposes and described with reference to Fig. 3 may be adapted to respond to such keying. If the "mark" or "space" only is indicated by a change from the mean recurrence frequency then the guard and ringing circuit as described may be employed to close an external circuit during each "mark" or "space." If on the other hand both "mark" and "space" are indicated by changes in opposite directions of the recurrence frequency then a circuit employing two valves, biassed in the same manner as the valves in the guard and ringing circuit of Fig. 3 may be employed to operate relays on both "mark" and "space" (above and below the recurrence frequency).

We claim:

1. In a speech communication system in which the speech signals are conveyed from a transmitting station to a receiving station in the form of recurrent pulses phase-modulated in accordance with the instantaneous amplitude of the speech signals, a demodulating circuit comprising a thermionic valve having a plurality of electrodes, means for applying blocking potentials to two of its electrodes, an output circuit connected to a third electrode, a source of locally-generated pulses of a frequency equal to that of the signal pulses, means for applying signal pulses to one of said blocked electrodes and the locally-generated pulses to the other blocked electrode to periodically remove both blocking potentials simultaneously for the period of overlap of the signal and locally-generated pulses, whereby voltage pulses of varying duration occur at said third electrode and are delivered to said output circuit, said source of locally-generated pulses including a control element arranged to vary the frequency of the locally-generated pulses in response to variations in the voltage applied to said element, an element traversed by the current in said thermionic valve, and means for applying the voltage occurring across said last named element, which is representative of the mean degree of overlap between the signal and locally-generated pulses, to said control element to synchronize the locally-generated pulses with the received signal pulses.

2. An electrical signalling system comprising a transmitting station, a receiving station, a channel connecting said stations, means at said transmitting station arranged to generate a train of recurrent signal pulses, a control element arranged to vary the timing of the pulses at frequencies above a predetermined low limit in accordance with intelligence of one kind, and at frequencies below said limit in accordance with intelligence of another kind, means at said receiving station arranged to generate local recurrent pulses, a circuit at said receiving station arranged to compare the timing of the signal pulses and the local pulses and to produce a first voltage comprising recurrent pulses varying in duration in accordance with the changes in timing of higher frequency, and a second voltage varying in magnitude in accordance with the changes in timing of lower frequency, and a separate utilization circuit controlled by each voltage.

HAROLD CANDELAND.
ZYGMUNT KONSTANTY HASS.

(References on following page)

REFERENCES CITED

The following references are of record in the file of this patent:

UNITED STATES PATENTS

| Number | Name | Date |
|---|---|---|
| 2,113,214 | Luck | Apr. 5, 1938 |
| 2,183,399 | Heising | Dec. 12, 1939 |
| 2,223,840 | Wolff | Dec. 3, 1940 |
| 2,252,599 | Lewis | Aug. 12, 1941 |
| 2,265,868 | Schonland | Dec. 9, 1941 |
| 2,266,401 | Reeves | Dec. 16, 1941 |
| 2,266,668 | Tubbs | Dec. 16, 1941 |
| 2,298,409 | Peterson | Oct. 13, 1942 |
| 2,339,536 | Wendt | Jan. 18, 1944 |
| 2,408,077 | Labin | Sept. 24, 1946 |
| 2,408,692 | Shore | Oct. 1, 1946 |
| 2,406,019 | Labin | Aug. 20, 1946 |
| 2,406,165 | Schroeder | Aug. 20, 1946 |
| 2,413,116 | Grieg | Apr. 1, 1947 |
| 2,425,314 | Hansell | Aug. 12, 1947 |
| 2,438,928 | Labin | Apr. 6, 1948 |

FOREIGN PATENTS

| Number | Country | Date |
|---|---|---|
| 585,827 | Great Britain | Feb. 26, 1947 |

OTHER REFERENCES

"A Portable Duplex Radio-Telephone," Lewis and Milner, Wireless Engineer, 13:475–482, September 1936.